(12) United States Patent  
Hoashi

(10) Patent No.: US 9,405,002 B2
(45) Date of Patent: Aug. 2, 2016

(54) OPTICAL RADAR DEVICE

(71) Applicant: DENSO CORPORATION, Kariya, Aichi-pref (JP)

(72) Inventor: Yoshiaki Hoashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 14/028,737

(22) Filed: Sep. 17, 2013

(65) Prior Publication Data

US 2014/0078488 A1    Mar. 20, 2014

(30) Foreign Application Priority Data

Sep. 18, 2012  (JP) .................................. 2012-204416

(51) Int. Cl.
*G01C 3/08* (2006.01)
*G01S 7/481* (2006.01)
*G01S 7/487* (2006.01)
*G01S 7/499* (2006.01)

(52) U.S. Cl.
CPC ............. *G01S 7/4817* (2013.01); *G01S 7/4812* (2013.01); *G01S 7/4876* (2013.01); *G01S 7/499* (2013.01)

(58) Field of Classification Search
CPC ... G01S 7/4817; G01S 7/4812; G01S 7/4876; G01S 7/499
See application file for complete search history.

(56) References Cited

U.S. PATENT DOCUMENTS

| 6,366,345 B1 | 4/2002 | Yamabuchi |
| 6,393,377 B1 | 5/2002 | Shirai et al. |
| 2003/0133093 A1 | 7/2003 | Asaka et al. |
| 2003/0179137 A1* | 9/2003 | White ............... H01Q 1/521 342/361 |
| 2012/0187283 A1* | 7/2012 | Yamada ............. G01S 17/936 250/234 |

FOREIGN PATENT DOCUMENTS

| JP | 03-175390 A | 7/1991 |
| JP | 2000137076 A * | 5/2000 |
| JP | 2001-074842 A | 3/2001 |
| JP | 2008-232642 A | 10/2008 |
| JP | 2011-122999 A | 6/2011 |

OTHER PUBLICATIONS

Office Action mailed Aug. 19, 2014 in corresponding JP application No. 2012-204416 (with English translation).
U.S. Appl. No. 14/028,765, filed Sep. 17, 2013, Hoashi.
Office Action mailed Nov. 11, 2014 issued in corresponding JP application No. 2012-204416 (and English translation).

* cited by examiner

*Primary Examiner* — Luke Ratcliffe
*Assistant Examiner* — Samantha K Abraham
(74) *Attorney, Agent, or Firm* — Posz Law Group, PLC

(57) ABSTRACT

An optical radar device for scanning an object that reduces the effects of stray light is provided. The optical radar device has a light source, a light scanning section, a light path change section, a light receiver, and an opposite phase signal adder. The opposite phase signal adder adds an opposite phase signal to the output signal from the light receiver. A rise timing of the opposite phase signal is delayed by a predetermined time relative to an output timing of the pulse light, and the opposite phase signal has an opposite phase with respect to a phase of the reflected light.

17 Claims, 5 Drawing Sheets

OPTICAL RADAR DEVICE

CROSS-REFERENCE TO RELATED APPLICATION

This application is based on and claims the benefit of priority of Japanese Patent Application No. 2012-204416 filed on Sep. 18, 2012, the disclosure of which is incorporated herein by reference.

TECHNICAL FIELD

The present disclosure generally relates to an optical radar device which scans an object by projecting a pulse light toward the object and receiving a reflected pulse light from the object.

BACKGROUND

Conventionally, an object may be scanned by projecting a pulse light at the object. A reflected light from the scanned object is received to obtain information regarding the scanned object, such as a distance to the object, a relative speed of the object and the like. Coaxial type optical radar devices are examples of such optical radar devices, which have a light emitter and a light receiver coaxially disposed on the same axis.

Generally, coaxial type optical radar devices suffer from stray light (i.e., clutter or undesired-reflection light) generated inside or within a close proximity of the device. The stray light or clutter may enter the device and be received by a light receiving element. As a result, the stray light may be perceived as noise. That is, noise may be caused by the stray light. Consequently, patent documents 1 and 2 (i.e., Japanese Patent Laid-Open No. 3881313 gazette and JP-A-2008-232642), for example, disclose solutions for reducing the effects of stray light by desensitizing or reducing the sensitivity of the light receiving element during a period when stray light exists.

However, a consequence of desensitizing or reducing the sensitivity of the light receiving element during a period when stray light exists, is a disabling of the detection of the reflected light from the detection object itself. In other words, if reflected light from the object is received at the same time as stray light, due to the desensitizing or reduction of the sensitivity of the light receiving element, the light receiving element may not detect the reflected light from the detection object itself.

SUMMARY

It is an object of the present disclosure to provide an optical radar device that appropriately obtains object information from a detection object by reducing effects of stray light or clutter.

In an aspect of the present disclosure, the optical radar device has a light source that outputs a pulse light and a light scanning section that operates a mirror plate (i) to reflect the pulse light toward an object and (ii) to reflect a reflected light received from an object. The optical radar device also has a light path change section that guides the pulse light outputted from the light source toward the light scanning section and guiding the reflected light reflected by the light scanning section in a direction that is different from a light source direction. Further, the optical radar device has a light receiver receiving the reflected light and an opposite phase signal adder that adds an opposite phase signal to the output signal from the light receiver. A rise timing of the opposite phase signal is delayed by a predetermined time relative to an output timing of the pulse light, and the opposite phase signal has an opposite phase with respect to a phase of the reflected light.

Further, the optical radar device has an opposite phase signal adder that adds an opposite phase signal to the output signal from the light receiver. A rise timing of the opposite phase signal is delayed by a predetermined time relative to an output timing of the pulse light, and the opposite phase signal has an opposite phase with respect to a phase of the reflected light. Such configuration reduces effects of stray light or clutter and enables the device to appropriately obtain information regarding the scanned object.

More specifically, even if reflected light from the object is received at the same time as stray light, effects of stray light are reduced and an appropriate obtainment of information regarding the scanned object is enabled.

The opposite phase signal may have a timing that corresponds to when the stray light, generated inside or at close proximity to the optical radar device, is received by the light receiver, for example. Alternatively, the opposite phase signal may have another timing that is close to such timing. In such manner, effects of stray light are further reduced.

The optical radar device of the present disclosure may preferably be equipped with an amplitude controller to control an amplitude of the opposite phase signal. With such a controller, effects of stray light are further reduced since the amplitude of the opposite phase signal may be closer to the amplitude of the stray light.

The amplitude controller may control the amplitude of the opposite phase signal according to a device state of the optical radar device, for example. In this case, even if the amplitude of the stray light changes according to the device state of the optical radar device, effects of the stray light are reduced by changing the amplitude of the opposite phase signal according to the change of the stray light. Factors influencing the amplitude of the stray light may broadly be considered, such as, for example, a scanning direction of the light scanning section, an internal temperature of the optical radar device, a cumulative use time of the light source, etc.

The optical radar device of the present disclosure may increase the amplitude of the opposite phase signal corresponding to the stray light, if, for example, the light received by the light receiver has a specific amount of delay relative to the output timing of the pulse light and the light received by the light receiver is constant, which indicates a likelihood of the presence of stray light. In such manner, the stray light is further reduced.

The opposite phase signal adder may add the opposite phase signal by performing a digital operation, for example. In such manner, the configuration of the optical radar device may be simplified.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

First Embodiment

Figure 1:
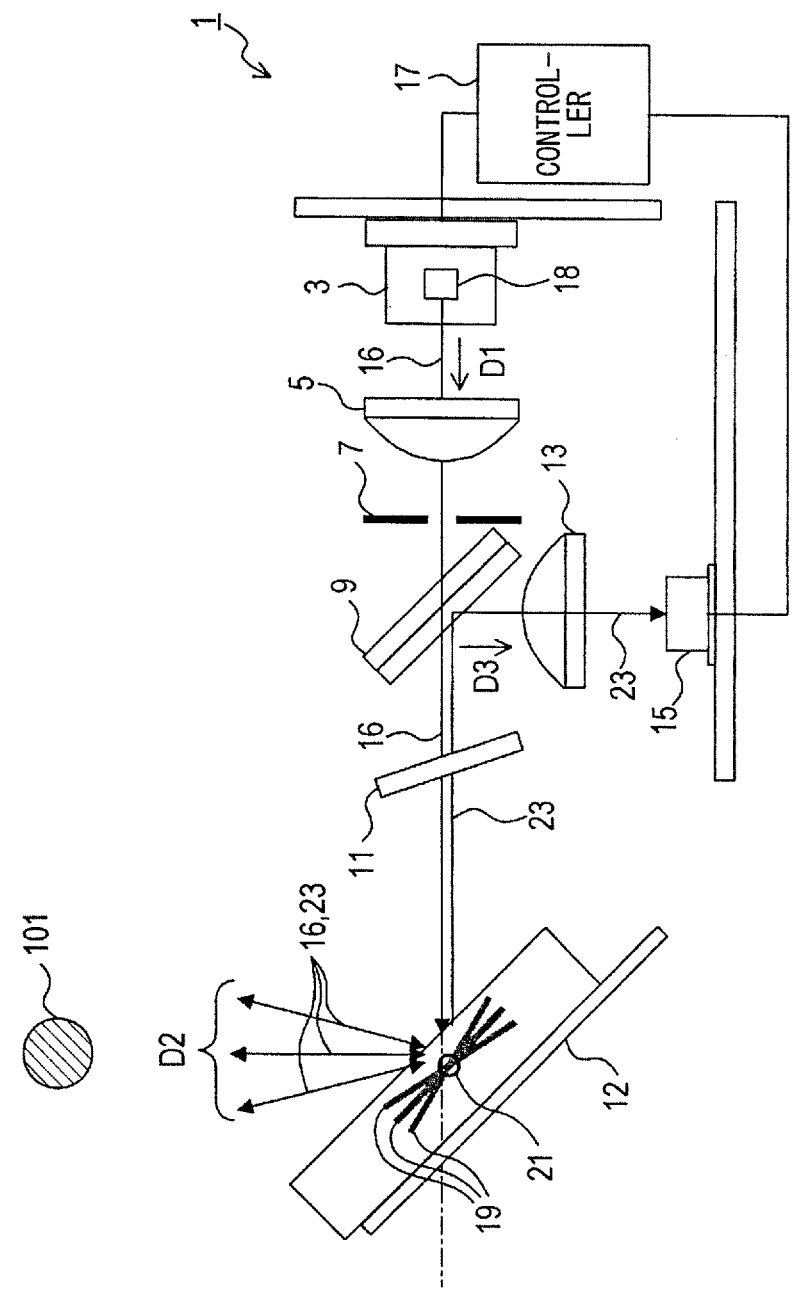
FIG. 1 is a configuration diagram of an optical radar device in a first embodiment of the present disclosure.

1. Configuration of an Optical Radar Eevice 1

The configuration of the optical radar device 1 is explained based on FIGS. 1 to 4. The optical radar device 1 is an on-board vehicular device. The optical radar device 1 may be a coaxial optical radar device having a light emitter and a light receiver coaxially included on the same axis (i.e., a single axis). The optical radar device is provided with a light source 3, a collimate lens 5, an aperture 7, a polarized beam splitter (i.e., a light path change section) 9, a λ/4 board (i.e., a ¼ wave length plate) 11, a light scanning section 12, a light receiving lens 13, and a light receiver 15, and a controller 17. The polarized beam splitter 9 is one embodiment of an optical path changing section, and the controller 17 is one embodiment of an opposite phase signal adder and an amplitude controller.

The light source 3 is a device that emits/outputs a pulse light 16 from an edge emitting type the laser diode (LD) 17 in a light output direction D1 shown in FIG. 1. The pulse light is linearly-polarized in a polarization direction α.

The collimate lens 5 is disposed at a position in the light output direction D1 relative to the light source 3. The collimate lens 5 aligns the light 16 into a parallel light.

The aperture 7 is disposed at a position along the light output direction D1 relative to the collimate lens 5. The aperture 7 cuts/narrows the width of the light 16 into a preset range.

The polarized beam splitter 9 is disposed at a position in the light output direction D1 relative to the aperture 7, and is angled at 45 degrees relative to the light output direction D1. The polarized beam splitter 9 is a device which has a well-known structure that allows the linearly-polarized light polarized in the polarization direction α to pass therethrough, and reflects the light that is polarized in the other directions. As mentioned above, since the pulse light 16 is linearly-polarized in the polarization direction α, the polarized beam splitter 9 allows the pulse light 16 to pass therethrough, and guides the pulse light 16 in a direction toward the light scanning section 12. Further, since the polarization direction of a reflected light 23 to be mentioned later is shifted by 90 degrees against the polarization direction α, the reflected light 23 is reflected by the polarized beam splitter 9 in a reflected-light-proceeding direction D3 (i.e., a different direction that is different from the direction toward the light source 3).

The λ/4 board 11 is positioned in the light output direction D1 relative to the polarized beam splitter 9, and is angled relative to the light output direction D1. The λ/4 board 11 converts the linearly-polarized light into a circularly-polarized light, and also converts the circularly-polarized light into the linearly-polarized light. Therefore, the λ/4 board 11 converts the pulse light 16 into the circularly-polarized light, and converts the reflected light 23 to be mentioned later into the linearly-polarized light. Further, the polarization direction of the reflected light 23 that has been converted into the linearly-polarized light is shifted by 90 degrees against the polarization direction of the pulse light 16 (i.e., the polarization direction before the conversion into the circularly-polarized light).

Figure 2:
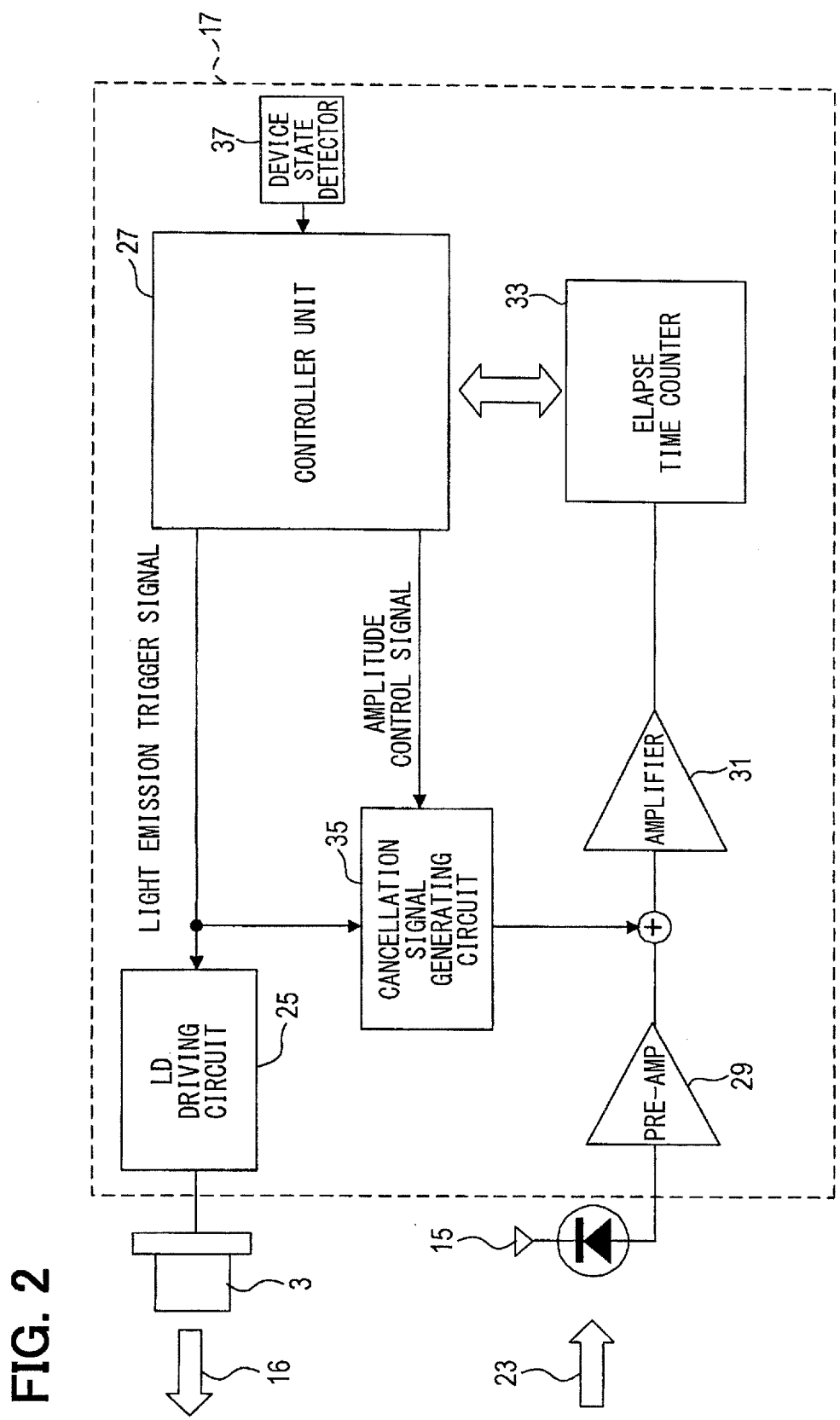
FIG. 2 is a block diagram of a controller of the optical radar device.

The light scanning section 12 is disposed at a position in the light output direction D1 relative to the λ/4 board 11. The light scanning section 12 has a circular mirror plate 19 which has a mirror surface formed on one side. The circular mirror plate 19 is rotatably disposed on a shaft 21. The light scanning section 12 may have a motor (not shown) that rotates the shaft 21 to rotate the mirror plate 19. The shaft 21 is positioned along a center of the mirror plate 19, and is parallel to a surface of the mirror plate 19. As illustrated in FIG. 2, the direction of the shaft 21 is perpendicular to the light output direction D1. The mirror plate 19 may have a range of rotation of approximately 60 degrees. As illustrated in FIG. 1, the range of rotation of the mirror plate 19 relative to the output-light-proceeding direction D1 may be between 15 to 75 degrees.

The mirror plate 19 reflects the pulse light 16 in a reflecting direction D2. The reflecting direction D2 may change according to the angle and rotating movements of the mirror plate 19. That is, the pulse light 16 is output in a scanningly rotated manner by changing the angle of the mirror plate 19.

The mirror plate 19 of the light scanning section 12 may also be rotated about another axis (not illustrated) that is perpendicularly to the shaft 21, which allows for a two-dimensional scanning of an object by using the pulse light 16.

After proceeding in the reflecting direction D2 and being reflected by an object 101 which is external to the optical radar device 1, the reflected light of the pulse light 16 (i.e., the reflected light 23 hereinafter) returns to the mirror plate 19 and is reflected by the mirror plate 19 to be guided in a direction toward the λ/4 board 11. The reflected light 23 is circularly-polarized.

The light receiving lens 13 is disposed at a position in the reflected-light-proceeding direction D3 relative to the polarized beam splitter 9 (i.e., at a position in a light path of the reflected light 23). The light receiving lens 13 converges the reflected light 23.

The light receiver 15 is disposed at a position in the reflected-light-proceeding direction D3 relative to the light receiving lens 13. The light receiver 15 may include a photo diode (PD) for detecting the reflected light 23.

The controller 17 is provided with an LD driving circuit 25 which drives the light source 3, a controller unit 27, a preamplifier 29, an amplifier 31 and the elapse time counter 33, a cancellation signal generating circuit 35, and a device state detector 37, as shown in FIG. 2.

The controller unit 27 may be a computer which performs processing to be mentioned later, and is provided with a CPU, RAM, ROM, etc.

Figure 3:
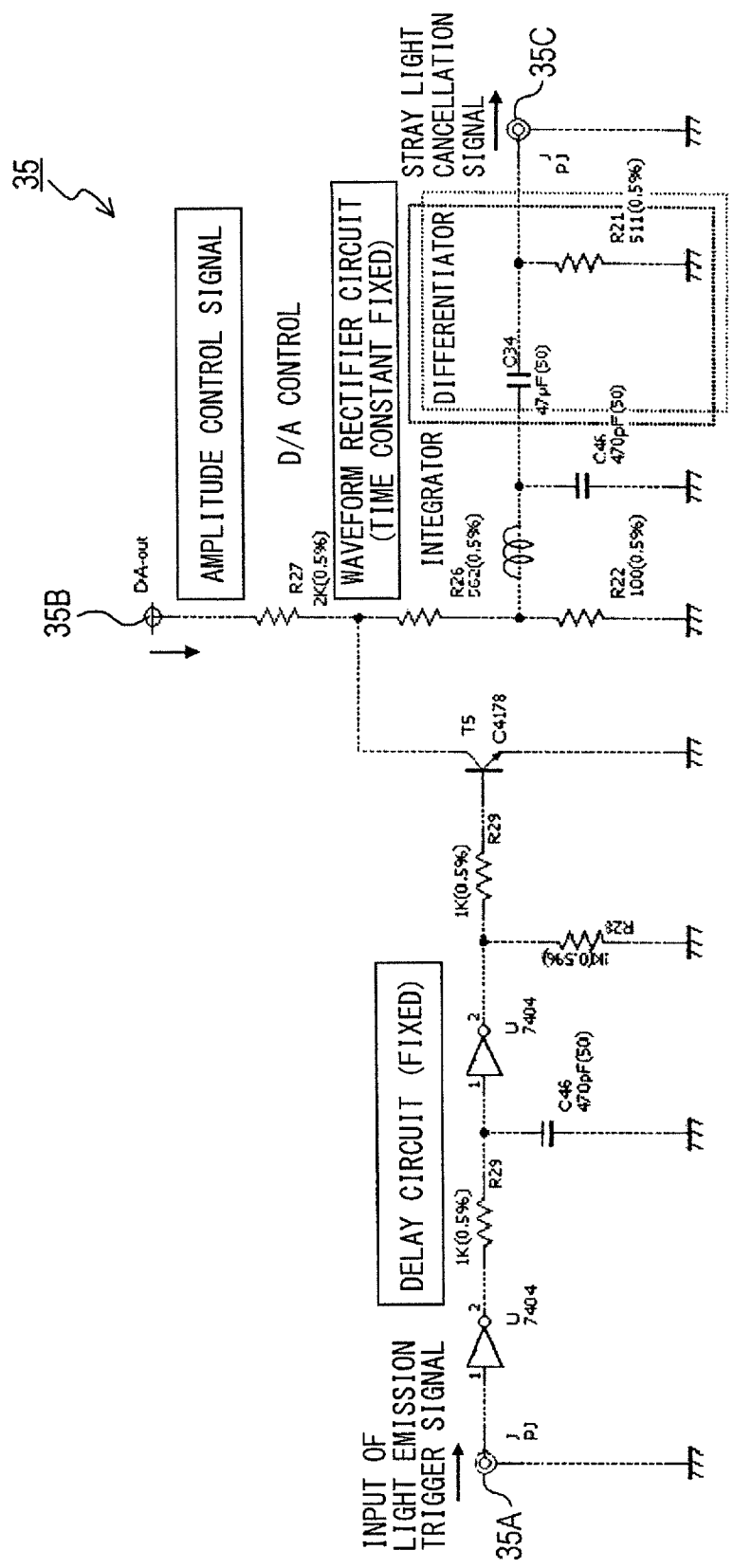
FIG. 3 is a schematic diagram of a laser diode driving circuit in the controller.

The cancellation signal generating circuit 35 is an RLC circuit which has a configuration shown in FIG. 3. The cancellation signal generating circuit 35 is provided with an input terminal 35A into which a light emission trigger signal to be mentioned later is input, an input terminal 35B into which an amplitude control signal to be mentioned later is input, and an output terminal 35C from which a stray light cancellation signal (i.e., an opposite phase signal) to be mentioned later is output. The cancellation signal generating circuit 35 is also provided with a delay circuit and a waveform rectifier circuit.

Referring to FIG. 2, the device state detector 37 detects a scanning direction of the light scanning section 12 (i.e., a direction of the mirror plate 19), an internal temperature of the optical radar device 1, and a cumulative use time of the light source 3, and outputs a detection result to the controller unit 27. Further, in the following, the scanning direction of the light scanning section 12, the internal temperature of the optical radar device 1, and the cumulative use time of the light source 3 are collectively considered as the device state of the optical radar device 1.

2. Process Performed by the Optical Radar Device 1

The controller unit 27 outputs the light emission trigger signal respectively to the LD driving circuits 25, the elapse time counter 33, and the cancellation signal generating circuit 35. The controller unit 27 generates the amplitude control signal based on the device state of the optical radar device 1 obtained from the device state detector 37, and outputs the amplitude control signal to the cancellation signal generating circuit 35.

The controller unit 27, which in this case memorizes to ROM a correspondence map that associates the device state of the optical radar device 1 with the value of the amplitude control signal, refers to the correspondence map, and looks up a corresponding value of the amplitude control signal, which is associated with the device state of the optical radar device 1 obtained from the device state detector 37.

The LD driving circuits 25 drive the light source 3 according to the light emission trigger signal which is output from the controller unit 27. The light source 3 driven by such a signal emits the pulse light 16 to the light output direction D1. The pulse light 16 is converted into a parallel light by the collimate lens 5, is narrowed by the aperture 7, passes through the polarized beam splitter 9, and is converted into the circularly-polarized light by the λ/4 board 11. The pulse light 16 converted into the circularly-polarized light is used by the light scanning section 12 to scan the object 101. The pulse light 16 is then reflected by the object 101 and generates the reflected light 23.

Next, the reflected light 23 received from the object 101 is reflected in a direction of the λ/4 board 11 by the mirror plate 19 of the light scanning section 12, and is converted into the linearly-polarized light by the λ/4 board 11. The polarization direction of the reflected light 23 that has been converted back into the linearly-polarized light has a shift of 90 degrees relative to the polarization direction α of the pulse light 16 (i.e., the polarization direction before the conversion into the circularly-polarized light). The reflected light 23, which has passed through the λ/4 board 11, is reflected in the reflected-light-proceeding direction D3 by the polarized beam splitter 9, is converged by passing through the light receiving lens 13, and is detected by the light receiver 15.

Figure 4:
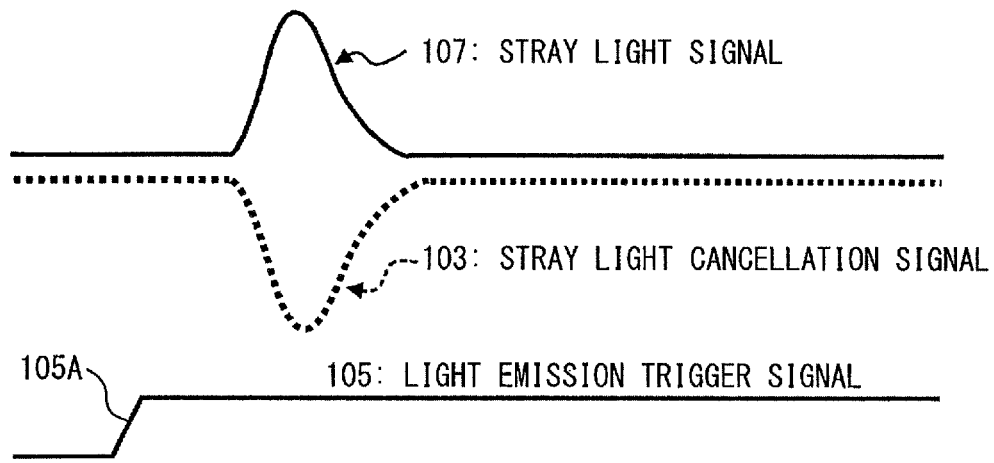
FIG. 4 is an illustration of a relationship between a stray light cancel signal, a light emission trigger signal, and a stray light.

On the other hand, the cancellation signal generating circuit 35 generates a stray light cancellation signal 103 (i.e., opposite phase signal) based on the light emission trigger signal and the amplitude control signal which are output from the controller unit 27. The stray light cancellation signal 103 is a pulse form signal which rises by a predetermined time later than a rise 105A of the light emission trigger signal 105 (i.e., a light output timing of the pulse light 16) as shown in FIG. 4, and the signal 103 has an opposite phase (i) relative to the phase of the stray light signal 107 generated inside or with a close proximity of the optical radar device 1 and (ii) relative to the phase of the reflected light 23. Further, the stray light signal 107 may be a reflection of the pulse light 16 that is reflected by the polarized beam splitter 9 or by the λ/4 board 11 before being received by the light receiver 15.

The amount of delay of the stray light cancellation signal 103 relative to the rise 105A of the light emission trigger signal 105 is a fixed value determined by a delay circuit in the cancellation signal generating circuit 35. Further, a waveform of the stray light cancellation signal 103 is a fixed waveform which is determined by the waveform rectifier circuit in the cancellation signal generating circuit 35. The amplitude (i.e., a wave height) of the stray light cancellation signal 103 is set up by the cancellation signal generating circuit 35 according to the value of the amplitude control signal inputted into the input terminal 35B.

Further, the amount of delay of the stray light cancellation signal 103 relative to the rise of the light emission trigger signal 105 and the waveform of the stray light cancellation signal 103 are predetermined at the time of manufacture of the optical radar device 1, so that the stray light cancellation signal 103 and the stray light signal 107 are similar and closely resemble each other in terms of the timing and the waveform. Further, even though the amplitude of the stray light cancellation signal 103 is controlled by the amplitude control signal as described above and the amplitude control signal is chosen by the controller unit 27 according to the device state of the optical radar device 1, the canceling relationship between the device state of the optical radar device 1 and the amplitude control signal in the controller unit 27 is predetermined so that the amplitude of the stray light cancellation signal 103 and the amplitude of stray light signal 107 resemble each other as closely as possible.

The cancellation signal generating circuit 35 adds the stray light cancellation signal 103 generated therein to the output signal of the light receiver 15. The output signal having the stray light cancellation signal 103 added thereto is then sent to the elapse time counter 33. The elapse time counter 33 computes a distance to the object 101 based on the time difference between an input time of the light emission trigger signal from the controller unit 27 and a detection time of the reflected light 23 included in the output signal of the light receiver 15.

3. Resultant Effects of the Optical Radar Device 1

(1) The optical radar device 1 adds the stray light cancellation signal 103 to the output signal of the light receiver 15. Since the stray light cancellation signal 103 is a signal that has a similar timing/waveform as the stray light, and has an opposite phase to the stray light, the output signal that is generated by adding the stray light cancellation signal 103, the stray light is either diminished or decreased. Therefore, the optical radar device 1 may compute a distance to the object 101 accurately, without being influenced by the stray light.

More specifically, even if the light receiver 15 receives the reflected light 23 from the object 101 at the same time that the light receiver 15 receives the stray light, the distance to the object 101 may still be computed accurately, without being influenced by the stray light.

(2) The optical radar device 1 is enabled to control (i.e., adjust) the amplitude of the stray light cancellation signal 103 according to the device state. Therefore, even when the amplitude of the stray light is changed according to the change of the device state of the optical radar device 1, the influence of the stray light is reduced by the changing of the amplitude of the stray light cancellation signal 103 according to the change of the device state.

Second Embodiment

The optical radar device 1 of the present embodiment has fundamentally the same configuration as the first embodiment, and achieves the same operational effect as the first embodiment. However, the optical radar device 1 of the present embodiment is configured to perform a learning process. The learning process in the present embodiment is described below.

Figure 5:
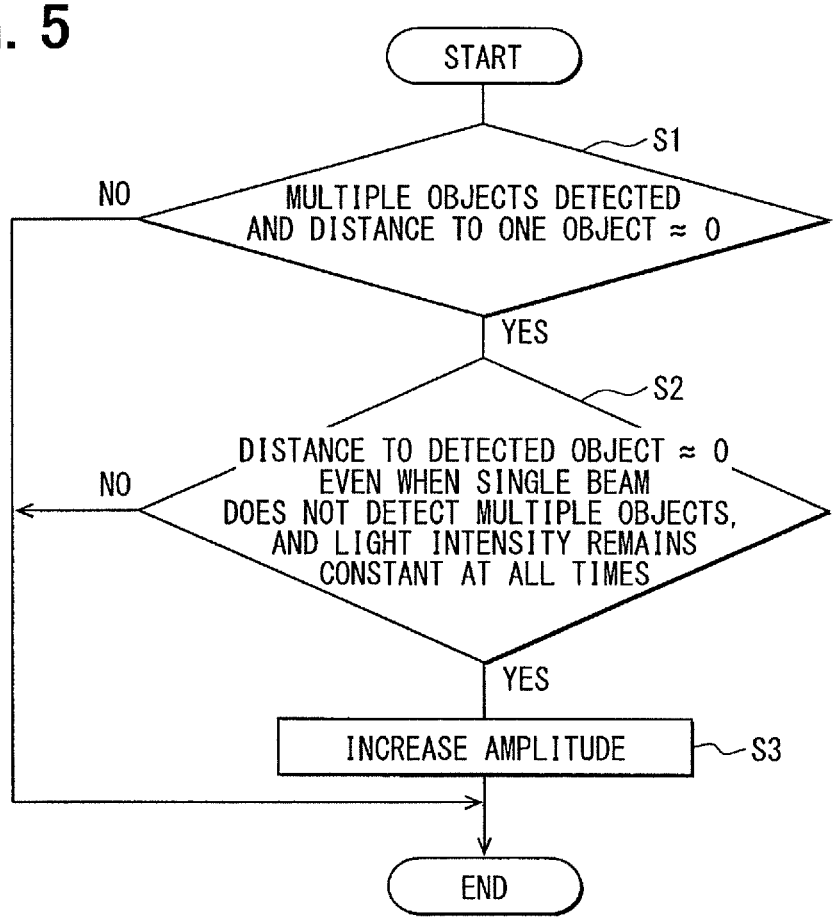
FIG. 5 is a flowchart of a learning process in a second embodiment of the present disclosure.

The controller unit 27 repeatedly performs a learning process shown in FIG. 5 at predetermined intervals. In Step S1 of FIG. 5, it is determined whether a "multiple objects are detected simultaneously, and a distance to one of the objects is about 0 meters" condition is satisfied. Such a determination is identical to a determination of whether an "in association with an initial pulse light 16, multiple lights are received by the light receiver 15 after the emission timing of the initial pulse light 16 and one of the multiple lights is received at a timing that corresponds to an object at a 0 meter distance" condition is fulfilled. When such a determination is positive, the process proceeds to Step S2. When such a determination is negative, the process ends.

In Step S2, it is determined whether a "a single object, to which a distance is measured as about 0 meters, is detected at a time of scanning of multiple object by using the pulse light 16 in a direction that is substantially same as the scanning direction in Step S1" condition is satisfied, and whether a "a light intensity of the received light is constant" condition is satisfied. Such a determination is identical to a determination of whether an "at a time of scanning of multiple objects by using the pulse light 16 in a direction that is substantially the same as the scanning direction in Step S1, in which multiple objects have been detected, the received light indicates the same object distance and the same light intensity as the one in Step S1" condition is satisfied. When such a determination is positive, the process proceeds to Step S3. When such a determination is negative, the process ends.

In Step S3, the above-described correspondence map which is used to define the value of the amplitude control signal (i.e., the amplitude of the stray light cancellation signal 103) is rewritten. More specifically, in a correspondence map, a value of the amplitude control signal corresponding to a scanning direction when an object to which the distance is detected as about 0 meters in Steps S1 and S2, is rewritten to a larger value than the pre-rewritten value. In such manner, the amplitude of the stray light cancellation signal 103 is increased relative to the amplitude at a time when the scanning direction of the pulse light 16 is the same as the scanning direction in Steps S1 and S2 (i.e., the same scanning direction when an object at a distance of about 0 meters is detected) is increased.

In Steps S1 and S2, the optical radar device 1 of the present embodiment is enabled to detect a stray light (i.e., the light corresponding to a 0 meter distance object in Steps S1 and S2) which constantly exists. Then, after detecting a constantly-existing stray light, the amplitude of the stray light cancellation signal 103 which cancels the stray light is increased in Step S3. In such manner, the stray light is further reduced.

The reason why the optical radar device 1 of the present embodiment is enabled to detect the constantly-existing stray light in Steps S1 and S2 is as follows. Since the stray light is mainly composed of stray lights inside of the optical radar device 1, it is detected as an object of having a 0 meter distance. The pulse light 16 has a very narrow diameter/width which is unlikely to be reflected by multiple objects (at substantially the same time). Therefore, when Step S1 has a positive determination result, the light detected as a 0 meter distance object from among the detected multiple objects is likely to be caused by stray light. Further, in Step S2, if the light corresponding to the 0 meter distance object continues to be detected even after a situation surrounding the optical radar device 1 has been changed (i.e., even after ceasing detection of a non-0 meter distance object), such a light may be determined as a constantly-existing stray light.

As presented in the second embodiment, the controller unit 27 illustrates one embodiment of a stray light detection section and an amplitude increaser.

Third Embodiment

Although the optical radar device 1 of the present embodiment has fundamentally the same configuration as the device 1 in the first embodiment and achieves the same effects, the device 1 in the third embodiment differs from the device 1 in the first embodiment. In the following, the description is focused to such difference.

Figure 6:
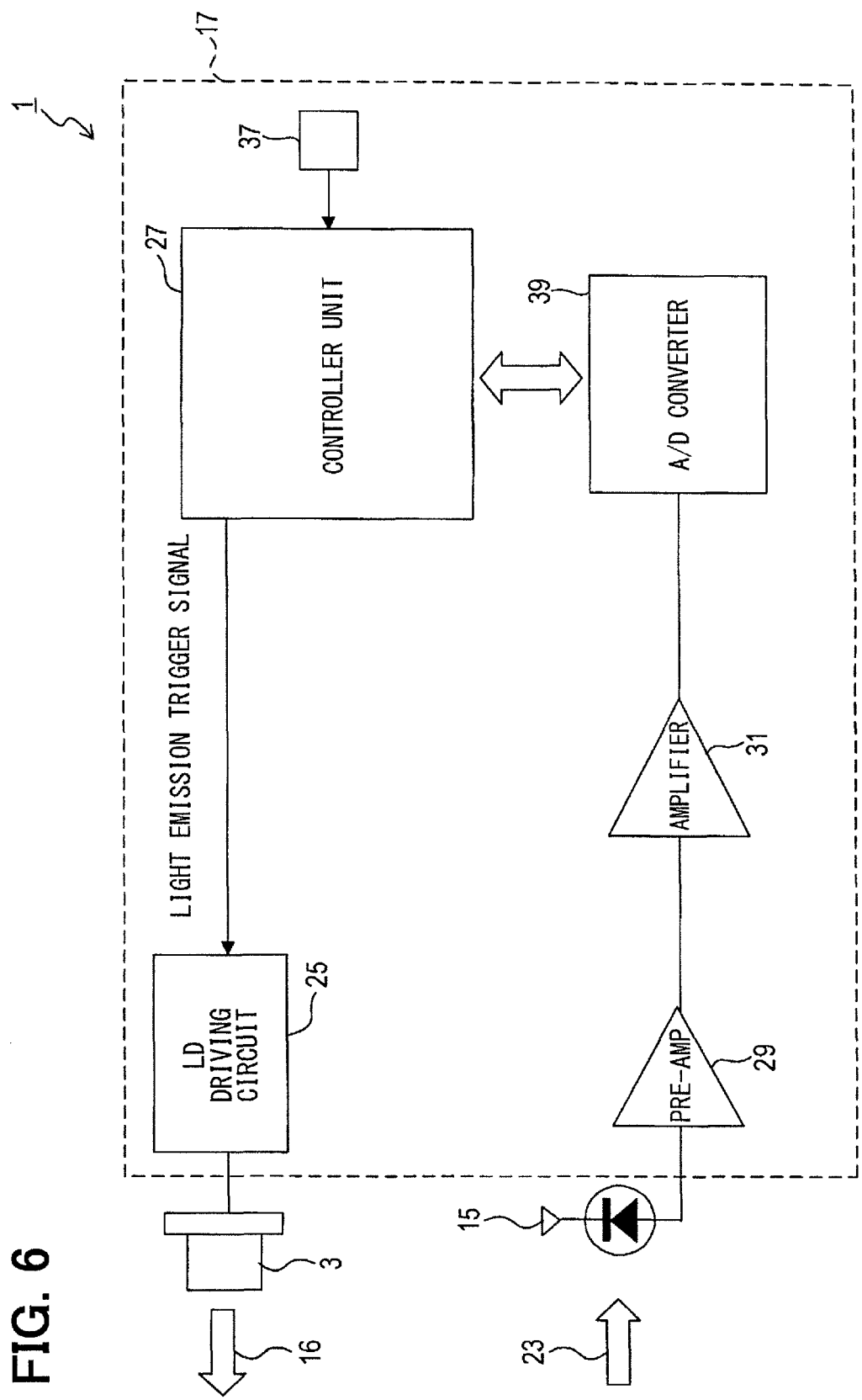
FIG. 6 is a configuration diagram of the entire optical radar device in a third embodiment of the present disclosure.

As shown in FIG. 6, the optical radar device 1 of the present embodiment does not have the cancellation signal generating circuit 35 and the elapse time counter 33 in the first embodiment, but is instead provided with an A/D converter 39.

In the present embodiment, the controller unit 27 generates a digital stray light cancellation signal. The stray light cancellation signal has a predetermined time delay from the rise of the light emission trigger signal, and has an opposite phase to the stray light or the reflected light generated inside or at close proximity to the optical radar device 1. The amplitude of the stray light cancellation signal is determined as a value which is chosen by the controller unit 27 according to the device state of the optical radar device 1. The device state of the optical radar device 1 is same as the first embodiment.

The A/D converter 39 converts the output signal of the light receiver 15 into a digital signal. The controller unit 27 adds, by performing a digital operation, the above-mentioned stray light cancellation signal to the output signal of the light receiver 15 which has been converted into the digital signal. Further, the controller unit 27 computes a distance to an object based on the output signal of the light receiver 15 after adding the stray light cancellation signal to it.

When compared to the device 1 in the first embodiment, the optical radar device 1 of the present embodiment has a simpler device configuration while achieving the same operation effects as the first embodiment.

Although the present disclosure has been fully described in connection with the above embodiment thereof with reference to the accompanying figures, various changes and modifications may become apparent to those skilled in the art.

For example, in the first to third embodiments, a stray light cancellation signal may be generated to have the same phase as the stray light, such that the stray light cancellation signal having the same phase may be subtracted from the output signal of the light receiver 15.

Further, in the first to third embodiments, the amplitude control signal may be set up based on any of the following conditions including the scanning direction of the light scanning section 12, the internal temperature of the optical radar device 1, and the cumulative use time of the light source 3. Further, the amplitude of the stray light cancellation signal may have a fixed value.

Further, in the first to third embodiments, the timing and/or the waveform of the stray light cancellation signal may be controlled according to the device state of the optical radar device 1.

Further, in the first to third embodiments, two or more stray light cancellation signals may be generated, and each of those stray light cancellation signals may be added to the output signal of the light receiver 15.

Further, the first to third embodiments may arbitrarily be combined.

Such changes and modifications are to be understood as being within the scope of the present disclosure as defined by the appended claims.

What is claimed is:
1. An optical radar device comprising:
  a light source outputting pulse light;
  a light scanning section operating a mirror plate to reflect the pulse light toward an object and to reflect reflected light received from the object;
  a light path change section guiding the pulse light outputted from the light source toward the light scanning sec- tion and guiding the reflected light reflected by the light scanning section in a direction that is different from a light source direction;

a light receiver that receives the reflected light; and an opposite phase signal adder that adds an opposite phase signal to the output signal from the light receiver, that delays, by a predetermined time, a rise timing of the opposite phase signal to match a timing at which stray light is received by the light receiver relative to an output timing of the pulse light, that adjusts the opposite phase signal to match both an amplitude of the stray light and a resulting waveform of the stray light, and the opposite phase signal has an opposite phase with respect to a phase of the reflected light.

2. The optical radar device of claim 1, wherein
a timing of the opposite phase signal is a timing at which stray light generated inside or near the optical radar device is received by the light receiver.

3. The optical radar device of claim 1 further comprising:
an amplitude controller that controls an amplitude of the opposite phase signal.

4. The optical radar device of claim 3, wherein
the amplitude controller controls the amplitude of the opposite phase signal according to a device state of the optical radar device.

5. The optical radar device of claim 4, wherein
the device state of the optical radar device is at least one of plural factors which is chosen from a group of factors, the group of factors including a scanning direction of the light scanning section, an internal temperature of the optical radar device, and a cumulative use time of the light source.

6. The optical radar device of claim 4, wherein
the device state is determined based on each of a scanning direction of the light scanning section, an internal temperature of the optical radar device, and a cumulative use time of the light source.

7. The optical radar device of claim 4, wherein the device state is a scanning direction of the light scanning section.

8. The optical radar device of claim 4, wherein the device state is an internal temperature of the optical radar device.

9. The optical radar device of claim 4, wherein the device state is a cumulative use time of the light source.

10. The optical radar device of claim 1 further comprising:
a stray light detector that detects a stray light that is characterized, from among the lights received by the light receiver, as having a predetermined delay from an output timing of the pulse light and as being constantly existing; and an amplitude increaser that increases the amplitude of the opposite phase signal relative to the stray light detected by the stray light detector.

11. The optical radar device of claim 1, wherein
the opposite phase signal adder performs a digital operation for the addition of the opposite phase signal.

12. The optical radar device of claim 1, wherein the opposite signal has an opposite phase relative to the phase of the stray light.

13. The optical radar device of claim 1, wherein the opposite phase signal adder further includes a waveform rectifying circuit.

14. The optical radar device of claim 1, wherein the stray light is different than the reflected light.

15. The optical radar device of claim 1, further comprising
a collimate lens that is located between the light source and the light path change section, and that is configured to convert the pulse light into linearly-polarized light, and
a quarter wave plate that is located between the light path change section and the light scanning section, and that is configured to convert the pulse light from linearly-polarized light to circularly-polarized light, and to convert the reflected light from circularly-polarized light to linearly polarized light.

16. The optical radar device of claim 1, wherein the opposite phase signal adder adjusts the opposite phase signal to match the resulting waveform of the stray light in response to different device states, which each include a distinct stray light pattern.

17. The optical radar device of claim 1, wherein the stray light is a constantly-existing stray light.

* * * * *